United States Patent [19]
Hanusiak et al.

[11] Patent Number: 5,624,516
[45] Date of Patent: Apr. 29, 1997

[54] METHODS OF MAKING PREFORMS FOR COMPOSITE MATERIAL MANUFACTURE

[75] Inventors: William M. Hanusiak; Lisa B. Hanusiak, both of Candia, N.H.; Jeffrey M. Parnell, Chelmsford, Mass.; Steven R. Spear; Charles R. Rowe, both of Derry, N.H.

[73] Assignee: Atlantic Research Corporation, Vienna, Va.

[21] Appl. No.: 359,388

[22] Filed: Dec. 20, 1994

[51] Int. Cl.$^6$ .................. B29C 65/48; B32B 31/12; B65H 81/00

[52] U.S. Cl. .................. 156/173; 156/178; 156/179; 156/249; 156/276; 156/280; 228/190

[58] Field of Search .................. 156/171, 172, 156/173, 176, 178, 179, 247, 249, 276, 280, 278, 297; 428/110, 113, 114, 323, 328, 461, 472, 542.8, 608, 614, 698, 549, 551, 552, 553, 567, 568, 539.5; 419/8, 14, 37; 228/135, 139, 190, 262.2, 262.21; 29/418, 424; 264/271.1, 279, 279.1; 427/203, 205

[56] References Cited

U.S. PATENT DOCUMENTS

| | | | |
|---|---|---|---|
| H1162 | 4/1993 | Yamamoto et al. | 156/179 |
| 2,951,003 | 8/1960 | Stephens . | |
| 3,024,152 | 3/1962 | Klug | 156/280 |
| 3,218,704 | 11/1965 | Kraus et al. . | |
| 3,391,050 | 7/1968 | Nebesar . | |
| 3,609,855 | 10/1971 | Schmidt | 228/190 |
| 3,719,538 | 3/1973 | Carlson et al. | 156/179 |
| 3,930,605 | 1/1976 | Merrill et al. . | |
| 4,110,505 | 8/1978 | Prewo | 156/179 |
| 4,305,449 | 12/1981 | Lozewski et al. . | |
| 4,454,192 | 6/1984 | Suzuki . | |
| 4,655,384 | 4/1987 | Rigdon et al. . | |
| 4,697,324 | 10/1987 | Grant et al. . | |
| 4,705,708 | 11/1987 | Briggs et al. . | |
| 4,732,314 | 3/1988 | Sakamoto . | |
| 4,782,992 | 11/1988 | Doble . | |
| 4,907,736 | 3/1990 | Doble . | |
| 4,938,824 | 7/1990 | Youngkeit | 156/173 |
| 5,004,575 | 4/1991 | Johnston et al. . | |
| 5,042,710 | 8/1991 | Siemers et al. . | |
| 5,094,883 | 3/1992 | Muzzy et al. | 427/195 |
| 5,098,011 | 3/1992 | Runyan . | |
| 5,181,647 | 1/1993 | Runyan . | |
| 5,184,769 | 2/1993 | Moracz et al. . | |
| 5,188,878 | 2/1993 | Takezawa et al. . | |
| 5,253,794 | 10/1993 | Siemers et al. . | |
| 5,259,051 | 11/1993 | Burack et al. | 156/60 |
| 5,271,776 | 12/1993 | Siemers et al. . | |
| 5,279,879 | 1/1994 | Takezawa et al. . | |
| 5,337,940 | 8/1994 | Woods et al. | 228/190 |
| 5,431,984 | 7/1995 | Keck et al. | 156/169 |

FOREIGN PATENT DOCUMENTS

| | | |
|---|---|---|
| 0366979A2 | 5/1990 | European Pat. Off. . |
| 0490629A2 | 6/1992 | European Pat. Off. . |
| 0632087A1 | 1/1995 | European Pat. Off. . |
| 162317 | 9/1983 | Japan .................. 156/179 |
| 165210 | 8/1985 | Japan .................. 427/366 |

Primary Examiner—Steven D. Maki
Attorney, Agent, or Firm—Lowe, Price, LeBlanc & Becker

[57] ABSTRACT

The present invention relates to a manufacturing method of applying dry powder in a controlled manner to a variety of surfaces to form shapes, coatings, or composite materials. This is achieved by coating the surface with a tacky substance, applying the powder, and then coating the powder with a barrier coating that is insoluble in the solvent used in the tacky layer. The process is repeated to add the desired amount of powder. By the selection of powder size, size distribution, shape, and number of layers, precise control of mass loading can be achieved. The method can be used with titanium powder to form powder-coated fiber, non-woven mat, and tape cast performs which can be processed into fiber reinforced composite materials.

12 Claims, 2 Drawing Sheets

METHODS OF MAKING PREFORMS FOR COMPOSITE MATERIAL MANUFACTURE

FIELD OF THE INVENTION

The present invention is directed to methods of making preforms for composite material manufacture and products therefrom and, in particular, methods using titanium powder to form powder-coated fiber, non-woven mat and tape cast preforms.

BACKGROUND ART

The use of preforms or prepegs in the manufacture of composite materials is well known in the art. In these preforms, strengthening materials such as fibers, whiskers, particulates or the like are incorporated with matrix materials in a form for subsequent processing into fiber reinforced composite materials.

U.S. Pat. No. 5,279,879 to Takezawa et al. disclose a hybrid prepreg containing carbon fibers and at least one other reinforcing fiber. The reinforcing carbon fibers and foreign fibers are impregnated in a thermosetting matrix resin such as an epoxy. The sizes of the foreign fibers and reinforcing fibers are controlled to improve mechanical strength of the prepreg.

It is also known to make the prepegs or preforms by first forming a slurry of an organic binder and a coarse powder. The slurry is then applied uniformly to a fiber containing surface using a doctor blade set at a desired height above the surface. In other prior art processes, a powder, binder and solvent form a slurry which is squeezed onto a moving tape and cured. The fiber material for use in the composite material is then pressed into the tape surface.

Drawbacks associated with these prior art techniques include damage to the fibers and fiber misalignment due to the coarseness of the powders used when mixed with an organic binder. When using a doctor blade, the coarse powders are often dragged by the blade which can interfere with the alignment and spacing of the fibers. In addition, using a slurry as an application media makes it difficult to control the mass per unit area for the composite material preform.

When using the coarse powder-containing slurry, the slurry components can break down the adhesive used to keep the fibers in place during slurry application. Breakdown of the adhesive retaining the fibers in place can cause misalignment of the fibers and an adverse effect on the mass per unit area for the preform material.

In view of the deficiencies in these prior art processes, a need has developed to provide an improved method for making composite material preforms which permits precise control of the preform mass per unit area variable, is low in cost and avoids disruption of reinforcing material alignment in the preform during its manufacture.

In response to this need, the present invention provides a manufacturing method which permits the application of a dry powder in a controlled manner to a variety of surfaces to form various shapes, coatings or other types of composite materials. The inventive method eliminates the need for complicated and expensive equipment for formation of slurries or the like for powder application and is readily repeatable when producing stacked or other multiple layers or arrangements of the preforms or prepegs.

SUMMARY OF THE INVENTION

Accordingly, it is a first object of the present invention to provide a new and improved method of making preforms for composite material manufacture and products therefrom.

It is another object of the present invention to provide a preform manufacturing method which permits precise control of the mass per unit area for a given preform.

Another object of the invention is to provide a preform making method which permits precise alignment of the fiber material during preform manufacturer.

A still further object of the present invention is to provide preforms containing matrix and strengthening or filler materials which are held in place during subsequent processing such as curing, off-gassing or the like.

Other objects and advantages of the present invention will become apparent as a description thereof proceeds.

In satisfaction of the foregoing objects and advantages, the present invention, in its broadest embodiment, provides a method for making composite materials comprising the steps of providing a substrate and applying an adhesive to the substrate. One or more composite material components are then applied to the adhesive. The composite material components can be either a plurality of fibers arranged on the adhesive in a spaced apart relationship with powders applied therebetween or merely powder materials.

When fibers are utilized, the powder material is sized to fit between the spaced part fibers. The composite material component or components is then coated with a barrier layer which is mutually insoluble with the adhesive on the substrate. In this manner, the barrier layer does not breakdown the adhesive and cause disruption of the composite material component applied thereon.

Any number of layers of adhesive, composite material components and barrier layers can be utilized as part of the inventive preform. The substrate can be a sheet or strip material or can be cylindrical in configuration. The substrate material can be any material which is compatible with the adhesive. Preferred materials include aluminum, polyethylene or teflon as the sheet or strip material and silicon carbide fiber as the cylindrical material.

When manufacturing a preform using the fiber/powder arrangement, the fibers are wound on a drum followed by powder application between the spaced apart fibers. The powder is retained by the adhesive exposed by the spaced apart fibers.

In another aspect of the invention, a preform for making composite materials is disclosed which comprises a substrate, an adhesive layer on the substrate, at least one composite material component on the adhesive and a barrier layer covering the composite material component, the barrier layer and adhesive layer being mutually insoluble.

Preferably, the composite material component is either a powder material or the combination of spaced apart fibers and powders arranged therebetween.

Preferably, the adhesive is a polyisobutylene in a hexane solvent with the barrier layer being made from a polymethylmethacrylate in an acetone solvent.

The substrate can be a sheet or cylindrical structure such as a fiber or wire. When using fiber on a sheet substrate, the preferred construction is the layering of fibers with particles therebetween. The preform can be built up in layers of adhesive, composite material components and barrier layers in any number of layers for subsequent processing into a desired composite material shape. The substrate can be included in the layering process or it can be removed prior to layering depending on the desired application. For example, the substrate may be used as part of the matrix material or merely as a support for the composite material components.

BRIEF DESCRIPTION OF THE DRAWINGS

Reference is now made to the drawings of the invention wherein.

DESCRIPTION OF THE PREFERRED EMBODIMENTS

Figure 1:
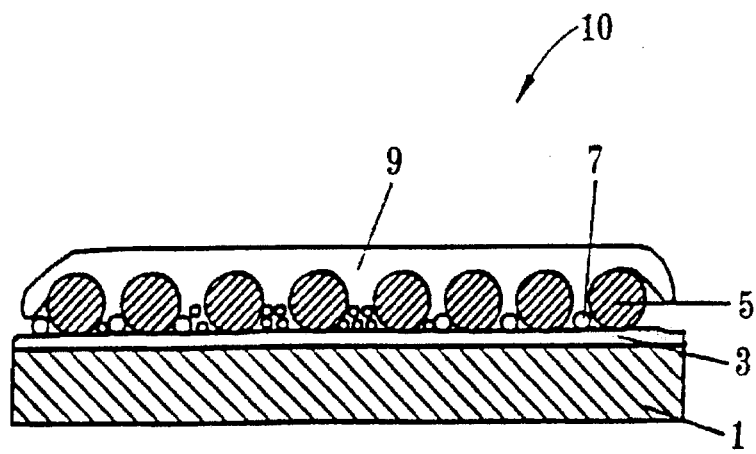
FIG. 1 is a cross-sectional view of an exemplary non-woven mat according to the invention.

The inventive method of making preforms or prepegs for the manufacture of composite materials represents a significant advance over known prior art techniques which are costly, require complex equipment and fail to provide a high quality preform having the desired strengthening component distribution and proper ratios between matrix materials and strengthening components.

According to the invention, in its broadest embodiment, at least one composite material component is applied to an adhesive-coated substrate. A barrier layer is applied over the composite material component, the barrier layer being mutually insoluble with the adhesive on the substrate. Mutual insolubility is intended to mean that none of the components, e.g. the polymer or solvent, of the adhesive are soluble in any of the barrier layer component, e.g. its solvent or polymer, and vice versa.

With the mutual insolubility between the adhesive and the barrier layer, the composite material component applied to the adhesive remains in place during subsequent preform curing and/or other processing. Consequently, the orientation and positioning of a desired composite material component is unaffected in subsequent layering sequences or other composite manufacture-related processing steps.

The composite material component includes any known strengthening element used in reinforced composite materials. Preferably, the composite material component is a filler material such as powders, whiskers, particulate material and fibers of short or extended length. In a more preferred embodiment, the composite material component comprises a first layer of fibers positioned in a spaced-apart relationship with powder material dispersed between the spaced-apart fibers, the powder material being retained in place by the adhesive on the substrate. The fibers and powders are then coated with the barrier layer. In this fashion, the fibers are maintained in their given spacing and the powders adhere to the exposed adhesive between the spaced apart fibers. Any excess powders can be merely brushed away or removed by gravitational forces without the need for expensive or complicated processing techniques.

The composite material components of the invention can be any materials conventionally used in composite material manufacture. For example, the strengthening components such as fibers, whiskers or the like can include carbon, kevlar, boron, silicon carbide, silicon nitride, alumina or the like.

If the composite material component is a filler material designed to be positioned between spaced-apart fibers or acting as a matrix material, the filler material is preferably a powder material. More preferably, the powder material is a metallic powder that is the composite matrix, e.g. titanium or the like.

The substrate receiving the adhesive can be any type which is adaptable to receive the adhesive. The substrate should be chemically inert to any solvents used in subsequent processing and provide a smooth, defect-free surface which will not cause perturbations in the material laid thereon such as the spaced apart fibers. The substrate can be a sheet or strip material such as aluminum foil or a polyethylene or teflon tape. Alternatively, the substrate material can be cylindrical in shape, e.g. a wire or fiber material such as silicon carbide or the like.

The adhesive material used to secure the composite material components such as fibers or powders to the substrate material should have characteristics such as minimal shrinkage during drying to maintain fiber spacing, insolubility with any other solvent used in subsequent processing, sufficient adherence to the substrate to allow the preforms to be handled in a manufacturing environment, sufficient adhesive removability to allow removal of the backing or substrate material after tape casting and the ability to be completely off-gassed. A preferred tacking adhesive is polyisobutylene dissolved in hexane at 1.0% by weight of the polymer. However, other known adhesives following the criteria given above and providing the desirable tackiness can be utilized in the instant invention.

The dimensions of the composite material components can be any suitable for composite material manufacturer. Fibers or whiskers can be any diameter and length and, when used in conjunction with the powder filler material, may be applied or wound at any spacing so long as some particles in the chosen powder mesh size will fit between the fibers. Preferably, silicon carbide fibers are selected in 0.005" diameters.

The mesh size of the powder material can be of any desired composition or size, depending on the powder end use. If the powder is used solely as the composite material component, the powder size does not have to meet the requirement of fitting between spaced-apart fibers. If powders are selected for use with the fibers, the powder size must sufficiently small to fit between the fibers. Preferably, the powder is sized less than 200 mesh when used with the spaced apart fibers.

The inventive preform and method of manufacture can be used in any known processes and apparatus for composite material manufacture. Exemplary of these types of processes include diffusion bonding, liquid metal infiltration, powder metallurgy processing techniques such as hot isostatic pressing or the like. Since these techniques are well known in the art, further detailed description thereof is not deemed necessary for understanding of the invention.

The preform made by the inventive method, in its single layer form of the adhesive, composite material component and barrier coating, can be used as a single layer such as a monolithic sheet primarily as a surface material when utilized with other preforms, as a base for a tape cast preform or as a non-woven mat which can be stacked up with layers of foil for use in fabricating fiber reinforced composite materials. Typical of the forms of the manufactured composite materials include sheets as structural components or inserts, rings for gears and turbine rotors, tubes or shafts, actuator rods and shells, fan blades, turbine components or the like.

The inventive method, through the selection of the various variables associated with one or more selected composite material components, permits precise control of mass loading when a given preform is made. That is, if a powder material is used, the powder size, size distribution, shape and number of preform layers can be adjusted to achieve a given mass per unit area value for subsequent composite material manufacture. Since the inventive method eliminates the use of a powder-containing slurry, precise control of the powder or other composite material component can be maintained. Thus, a method is provide which is low in cost and consistently repeatable for preform manufacture.

By using a tacking adhesive layer for retention of applied powders, either alone or in combination with spaced-apart fibers, the powder loading can be accurately controlled with excess powder easily removed by simple mechanical step of brushing, wiping or using gravity for powder removal. Moreover, the powder material not adhered to the tacking adhesive, can be readily recycled for subsequent layering.

With reference now to FIG. 1, a first embodiment of the invention is generally designated by the reference numeral 10 and is seen to include a substrate 1, adhesive layer 3 and spaced apart fibers 5 attached thereto. The fibers 5 are laid on the adhesive 3 in a spaced-apart relationship. Powder material 7 is then applied over the fibers and adhered to the adhesive 3 between the fibers 5. A barrier layer 9, mutually insoluble with the adhesive 3, is applied over the fibers 5 and powder 7.

Preferably, the substrate material is a 0.003" thick layer of O tempered type AA1100 aluminum foil. The adhesive is a 1% by weight polyisobutylene in a hexane solvent. The barrier layer is 1% by weight of polymethylmethacrylate (PMMA) dissolved in acetone.

Figure 2:
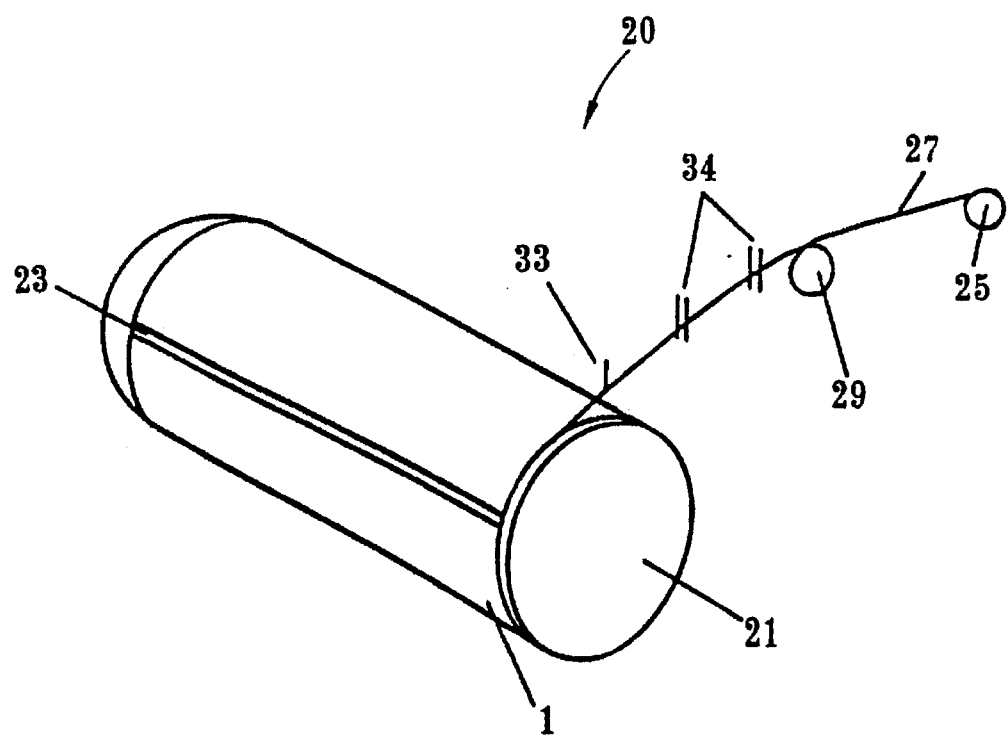
FIG. 2 is a schematic representation of an exemplary method of making the inventive preform.

Although any known techniques can be used to apply the composite material component to an adhesive-containing substrate, when spaced apart fibers are used, it is preferred to utilize a drum winding process. With reference now to FIG. 2, a schematic drum winding apparatus is generally designated by the reference numeral 20. The apparatus 20 includes a drum 21 which has been cleaned so that there is no dirt, powder, etc. on the drum surface that would become a bump under the substrate 1 and thereby cause a fiber spacing disturbance. One surface of the substrate 1 is also cleaned and the substrate is wrapped around the drum with the clean side facing the drum. The substrate can be adhered to the drum in any known fashion such as using an adhesive or the like.

The substrate 1 is wrapped on the drum leaving a gap 23, preferably about one quarter inch in width. The gap 23, preferably located at the same location on the drum, facilitates removal of the preform material.

Once the substrate 1 is applied to the drum 21, the substrate is smoothed and the outer surface is cleaned. During this cleaning, the drum operator presses down hard against the substrate so that any inclusions, bumps, etc. are defined. The bumps are then scraped with a razor blade to smooth them out.

The polyisobutylene-hexane mix is applied to the substrate with a foam brush while the drum is rotating. A sufficient quantity of the polyisobutylene-hexane mix must be applied in multiple coats so that the fiber will not shift on the substrate during drum winding. The coats must be allowed to dry completely before the next one is applied. The coats also cannot have any bubbles, drips, brush strokes or any other defects which may cause fibers spacing perturbations.

Still with reference to FIG. 2, the apparatus 20 includes a fiber spool 25, the fiber spool holding the fiber 27 to be wrapped around the drum. The fiber 27 is fed through a tensioning wheel 29 and aligners 31. The fiber is then taped to the substrate near one edge of the drum. An aligner tip 33 is positioned next to the fiber and the drum winding is instituted. When the fiber is wound around the drum in the desired width, the winding process is stopped and the end of the fiber 27 is taped down to the substrate. Preferably, 5 mil diameter silicon fibers are used and wound at a rate of 125 fibers per inch. This winding leaves about a 3 mil gap between fibers for receipt of the desired filler material such as powder.

Once the fiber has been wound in place on the drum, the powder 7 is sprinkled onto the drum wound mat. Any powder not positioned between the fibers is removed by lightly brushing the surface of the drum wound mat. A brush or cloth that does not fit between the fibers can also be used so that little or no powder is removed from between the fibers.

Following powder application, the barrier layer of PMMA in acetone is applied over the mat. As an alternative, the tacking adhesive 3 can be first supplied to the powered mat to seal the powder in and prevent it from falling out from between the fibers. The barrier layer 9 would then be applied over the adhesive.

Once the barrier layer is applied, the mat 10 is removed from the drum and can be stacked up for use in the fabrication of fiber reinforced composite materials. Alternatively, the substrate can be removed before stacking if desired.

In an alternative embodiment, the fibers 5 and powders 7 can be merely coated with the adhesive 3 which seals the powder in and prevents them from falling out from between the fibers. This mat construction, without the barrier layer, can be stacked such that layers of foil are adjacent the adhesive coated fibers and powders for subsequent fiber reinforced composite material manufacture.

Figure 3:
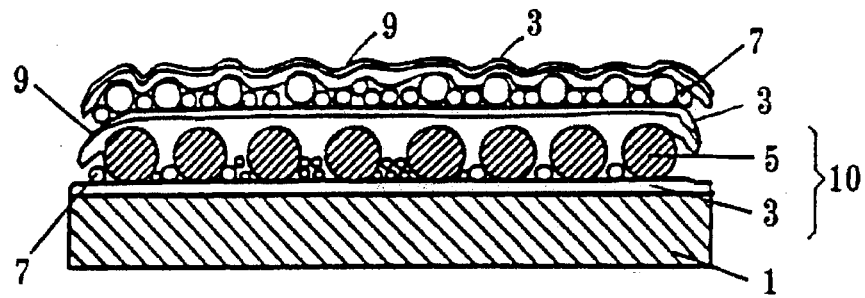
FIG. 3 is a cross-sectional view of a second embodiment of the invention showing a tape cast powder/fiber preform.

In a another embodiment, the mat 10 can be used to fabricate tape cast silicon carbide fiber preforms as shown in FIG. 3. FIG. 3 depicts the mat 10 with an additional adhesive layer 3 applied to the barrier layer 9. The adhesive layer 3 provides a tacking surface to receive the sprinkled-on powder 7.

The powder-covered mat 10 is then coated with the barrier material 3.

If further layering is required to achieve a predefined mass per unit area, the barrier coating 9 is coated with the adhesive 3, preferably two coats, followed by another sequence of powder coating followed by barrier layer application. The tape cast preforms of FIG. 3 can then be stacked for use in the fabrication of fiber reinforced composite materials.

Figure 4:
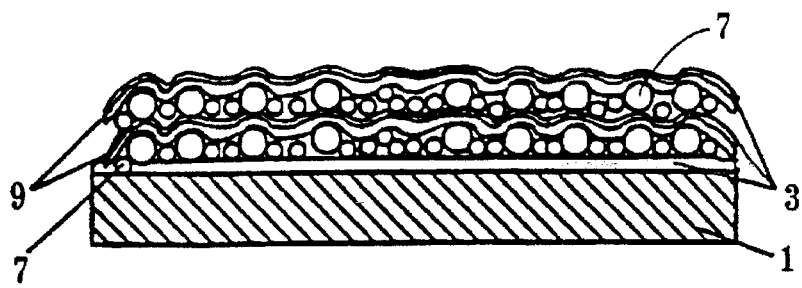
FIG. 4 is a cross-sectional view of a third embodiment of the invention showing a tape cast powder preform.

In a third embodiment of the invention, a monolithic tape cast powder preform without fiber material can be formed for subsequent composite material manufacture use. In FIG. 4, the adhesive 3 is coated with the powder material 7. A barrier layer 9 is then formed over the powder material 7 followed by another application of the adhesive material 3. A second powder layer material 7 is applied to the adhesive 3 followed by subsequent coating by a barrier layer and adhesive layer combination. This process can be repeated to form any number of powder material layers. These monolithic sheets can be preferably used as a surface material when stacked up with tape cast preforms as depicted in FIG. 3. Again, the powder material and substrate can be any known composition for these types of monolithic tape cast powder preforms. Preferably, the substrate is molybdenum foil.

In a preferred embodiment, the inventive preforms are particularly adapted for use in titanium matrix composite materials. That is, the matrix material is titanium with or without titanium aluminides and a reinforcing material such as silicon carbide.

Figure 5:
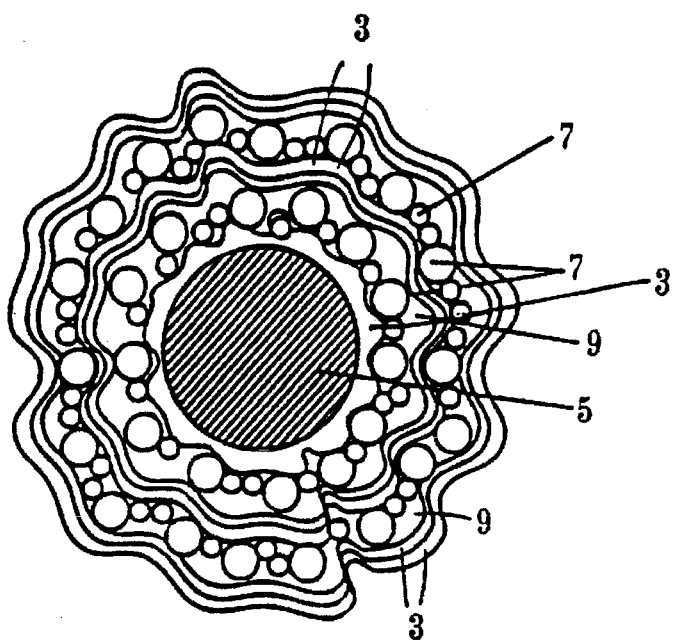
FIG. 5 is a fourth embodiment of the invention showing a powder coated fiber preform.

In a fourth embodiment of the invention, with reference to FIG. 5, a fiber 5 is utilized as the substrate. With a fiber as the substrate, the preform becomes a powder coated fiber preform which can then be assembled to form a tape cast preform as described above.

The substrate fiber 5 is first coated with the adhesive 3. Powder material 7 is then applied to the adhesive 3 followed by coating with the barrier layer 9.

Preferably, two coats of the adhesive material are then applied over the barrier layer 9 followed by another sequencing of powder 7 application, barrier layer 9 coating and two coats of the tacky adhesive 3. This sequencing can continue to form any desired number of layers or can be terminated after a single layering of the powder material.

In the embodiment depicted in FIG. 5, the powder material can be sprinkled onto the adhesive layer 3 followed by fiber 5 rotation such that the entire exposed surface of the adhesive is coated with powder. Alternatively, the fiber could be mounted on a rotating device so that the fiber rotates during powder sprinkling. Of course, any other known techniques can be utilized to apply the powder material to a given adhesive layer. Likewise, the tacky adhesive 3 and non-tacky barrier coating 9 can be applied using conventional techniques such as brushing, spraying or the like.

The composite material components can be a matrix material or a combination of a matrix material and strengthening component. For example, the powder material could combine both titanium and silicon carbide powders. Alternatively, the powder material could include titanium and aluminum in ratios to form a titanium matrix with sufficient aluminum to form titanium aluminides during subsequent composite material manufacture.

Although varying numbers of layers of the adhesive and barrier coating material are disclosed, it should be understood that the number of layers may vary depending on the type of powder, fiber or other composite material component utilized during preform manufacture. For example, if the powder size varies due to the combination of metallic and non-metallic materials, several layers of the barrier coating may be required before all the powder can be coated. Likewise, more than one adhesive layer may be required when applying additional layers of composite material components.

As such, an invention has been disclosed in terms of preferred embodiments thereof which fulfill each and every one of the objects of the present invention as set forth hereinabove and provides a new and improved method for making preforms for composite material manufacture and products therefrom.

Of course, various changes, modifications and alterations from the teachings of the present invention may be contemplated by those skilled in the art without departing from the intended spirit and scope thereof. Accordingly, it is intended that the present invention only be limited by the terms by of the appended claims.

We claim:

1. A method of making a preform for composite material manufacture comprising the steps of:
   a) providing a substrate
   b) applying a tacky adhesive to said substrate;
   c) applying a plurality of fibers to said tacky adhesive in a spaced apart relationship such that portions of the tacky adhesive are exposed; and
   d) subsequently applying a powder filler material on the exposed tacky adhesive such that said powder filler material adheres to the tacky adhesive and remains positioned between spaced apart fibers; and
   e) applying a polymeric barrier layer over said plurality of fibers and the filler material wherein said polymeric barrier layer is mutually insoluble with said tacky adhesive.

2. The method of claim 1 wherein step (d) includes applying excess powder filler material and removing the excess powder filler material.

3. The method of claim 1 wherein said filler material consists of a powder.

4. The method of claim 1 wherein said substrate is aluminum, said fibers are silicon carbide and said filler material is titanium powder.

5. The method of claim 1 wherein said adhesive has a hexane solvent as a component thereof and said polymeric barrier layer has an acetone solvent as a component thereof.

6. The method of claim 1 wherein another tacky adhesive is applied to the polymeric barrier layer and then the steps (c), (d) and (e) are repeated a number of times to form a plurality of preforms.

7. The method of claim 1 wherein said substrate is a sheet.

8. The method of claim 1 wherein said substrate is in sheet form and is applied to a cylindrical drum surface and said fibers are wound around said cylindrical drum.

9. The method of claim 8 wherein said substrate is sized to leave a gap between substrate ends when applied to said cylindrical drum.

10. The method of claim 1 wherein said preform is stacked for composite material manufacture.

11. The method of claim 1 wherein said substrate is removed and said substrate-less preform is stacked for composite material manufacture.

12. The method of claim 1 further comprising the steps of:
   (i) applying another tacky adhesive to the polymeric barrier layer;
   (ii) applying powder filler material onto the another tacky adhesive;
   (iii) applying a polymeric barrier layer onto the powder filler material applied to the another tacky adhesive; and
   (iv) repeating the steps of (i), (ii) and (iii) a number of times to form a plurality of preforms.

* * * * *